July 9, 1963 W. HÄCHLER 3,096,909
DEVICE FOR WEIGHING AND DISPENSING MATERIALS FOR MIXING THEREOF
Filed Oct. 7, 1960 4 Sheets-Sheet 1

INVENTOR.
WALTER HÄCHLER
BY Werner W. Kleeman
Attorney

July 9, 1963 W. HÄCHLER 3,096,909
DEVICE FOR WEIGHING AND DISPENSING MATERIALS FOR MIXING THEREOF
Filed Oct. 7, 1960 4 Sheets-Sheet 3

INVENTOR.
Walter Hächler
BY Werner W. Kleeman
Attorney

United States Patent Office 3,096,909
Patented July 9, 1963

3,096,909
DEVICE FOR WEIGHING AND DISPENSING MATERIALS FOR MIXING THEREOF
Walter Hächler, Alte Otelfingestrasse 42, Wettingen, Switzerland
Filed Oct. 7, 1960, Ser. No. 61,152
15 Claims. (Cl. 222—25)

The present invention generally relates to a dispensing device and, more particularly to a novel automatic weight dispenser for fluent material which may be granular, pulverant or the like and constituting individual constituents which are to be mixed together to form a predetermined composition or mixture for use thereafter. The invention is particularly suitable for mixing together loose stock in a predetermined proportional ratio and is of the type employing conveyer belts, each of which cooperates with a weighing device disposed below a respective supply container, each supply container being provided with adjustable slide members or trapdoors covering the mouth of the supply container and regulating the quantity of discharge of material contained therein.

As is already known, the individual constituents from which the required mixture may be formed are generally retained in supply containers usually designed in the form of silos or troughs which are provided at their lower end with a discharge opening adapted to be opened to a greater or lesser extent in accordance with the conditions of dispensing by means of a slide member or swingable trapdoor. For example, in the formation of concrete mixtures individual supply containers are provided for the various cement, gravel and sand constituents. In the heretofore known systems, the dispensing of the individual constituents of a concrete mixture was effectuated by separately weighing out each constituent. Upon the completion of the weighing of the required quantity of the individual constituents, the same are fed batchwise into suitable mixing machines. However, such a method of making concrete is inconvenient as well as cumbersome and timeconsuming, and further, fails to insure that an adequate consistency of the mixing proportions will be maintained at all times.

There are known prior art dispensing devices provided with conveyor belts used for the dispensing of fluent material according to weight, as for example, mixing sand and gravel, wherein variations of the quantity and proportions of the fluent material to be dispensed is obtained by regulation and altering of the speed of the conveyor belt. Such a method has the disadvantage, however, that the quantity of fluent material conveyed per unit time does not permit for any variation of the proportional ratio of the ingredients to be mixed which is greater than about 1 to 10 in view of the fact that the speed of the conveyer belt can not be increased above a certain limit. In many cases, however, the requirements of actual practice are such as to demand a far wider proportional range of the ingredients to be mixed. Another disadvantage of this known system resides in the fact that the accuracy of dispensing of the individual ingredients is oftentimes quite unsatisfactory, especially when working in the region of the upper and lower limits of the speed of the conveyor belt.

Other known weighing systems for the weighing out of loose or fluent material employ a slide arrangement for the passage of the material so as to vary the quantities of such fluent material emerging from the outlet portion of the supply hopper. With these systems, however, the method of regulating the dispensing of the materials at a desired rate and the resetting of the control indicator is either not automatic, or else, very complex and extremely subject to inaccurate operation or else complete inoperativeness. Another disadvantage of such systems is that the entire automatic control unit and weight adjustment assembly must be arranged directly adjacent, or in close proximity to the supply containers for the fluent material, or else, at the weighing device, and is therefore greatly subjected to vibration, soiling and weathering impairing the operation and integrity of the system.

Moreover, continual supervision and resulting of the control indicator places a great burden on the operators of the system, as oftentimes the various dispensing regions may, particularly in gravel works, be located at a substantially great distance from one another.

The present invention contemplates the provision of a novel system providing for a very accurate dispensing and continuous automatic control of the weight of the material dispensed as well as the continuous mixing of the various individual constituents; while simultaneously permitting ease of setting of the control points determining the mixing ratio within wide limits and performed from a central control station providing for continuous checking of the maintenance of such control points. This is most effectively carried out by employing a system wherein, with the speed of the conveyor belts remaining constant, remote and automatically operated transmission or repeater means are provided for transmitting the information of a weighing device to a control indicating device arranged at a central control station. An electrical control circuit regulates the driving motor operating the slide or trapdoor of the respective supply containers, which electric circuit is operatively connected to the control indicating device and actuates the regulating driving motor of the slide in such a manner as to cause the slide to move into a position corresponding to the setting of the control indicator, thereby determining the rate or quantity of discharge of the material contained in its associated supply container.

In comparison with the heretofore known methods of forming mixtures of specific composition, the system provided by the present invention has the advantage that the pre-set mixture produced is continuously maintained in any required proportion of the constituents. Moreover, it is possible to continuously change the individual constituents while maintaining the pre-set values constant. In a field-tested system of this type, the variation dispensing range of the individual constituents was between 0 and 3500 kilograms per minute.

A further advantage in the present system resides in the fact that automatization of the system can be carried out at relatively low cost by providing for templet-type control elements when working with specific, often employed mixing ratios. The conveyor belts which are disposed below the individual discharge orifices of the respective supply containers may be caused to run at a constant speed so that the weighing devices can always measure and indicate a constant quantity by weight of the materials conveyed per unit of time since the weight of the conveyor belt itself remains the same and can therefore be discounted. Thus, the scale of the indicated dial or pointer can be so adjusted as to indicate "zero" when the conveyor belt is empty. At the central control station it is thus possible to immediately detect any variation in the mixing ratio and undertake the necessary steps to restore the required ratio.

Accordingly, it is an important object of the present invention to provide means for automatically dispensing a desired amount of one or more constituents from respective supply containers in a reliable and accurate manner.

It is a further object of the present invention to provide means for automatically dispensing and feeding individual constituents in any predetermined amount and proportional ratio, the control of which may be executed from a central control station remotely located from the supply containers for said individual constituents.

It is another object of the present invention to provide means for quickly, reliably and automatically setting the control indicators controlling the dispensing of individual constituents from their associated supply containers at any desired weight and/or proportional ratio.

Another object of the present invention is the provision of means including templates for quickly, reliably and automatically setting the control indicators controlling the dispensing of individual constituents from their associated supply containers at any desired weight and/or proportional ratio.

These and further objects and the entire scope of applicability of the present invention will become readily apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
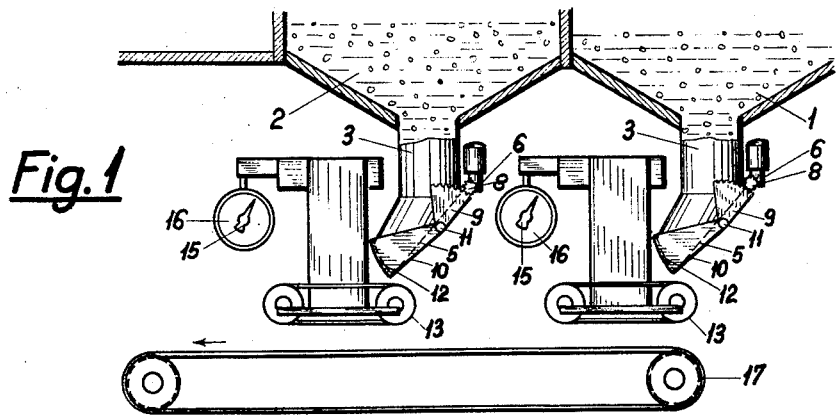
FIGURE 1 is a diagrammatic view, taken partly in section, of a weight dispensing system employing supply containers arranged one behind the other in conjunction with weighing devices and the various transport means.
Figure 2:
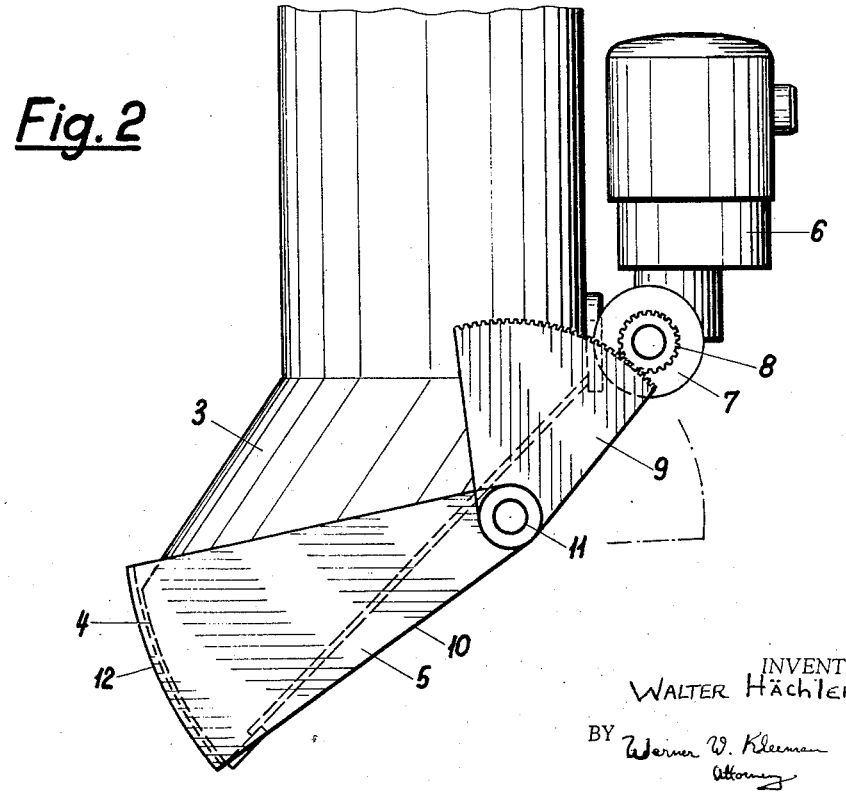
FIGURE 2 is a side view, on an enlarged scale, of the outlet portion of the supply container employing a regulating slide door operated by a driving motor.

Referring now to the drawings, in FIGURE 1 there is shown a pair of tandemly arranged supply containers 1 and 2, each of which stores an ingredient or constituent of the mixture to be prepared. Each of the supply containers 1 and 2 is provided at its lower end with a discharge channel 3 having a discharge orifice or aperture 4 adapted to be opened or closed to a greater or lesser extent by means of a regulating slide or trapdoor 5 in accordance with the position of the latter. The regulating slide 5 is operated by means of a driving motor 6 through the intermediary of a reduction gearing 7, a pinion 8 and a segmented gear portion 9. The segmented gear portion 9 is rigidly fixed to the side wall 10 of the regulating slide 5 and is mounted to pivot jointly with the latter about the pivot shaft 11. Thus, when the driving motor 6 rotates the pinion 7 in a counter-clockwise direction, the segmented gear portion 9 is caused to pivot in a clockwise direction so as to pivot the closing plate 12 of the regulating slide 5 upwardly, thus opening the discharge orifice 4 a predetermined amount corresponding to the extent of upward pivotal movement of the closing plate 12 of said regulating slide.

The fluent material leaving the discharge orifice 4 drops onto one of the associated conveyor belts 13 disposed therebelow. The conveyor belt 13 in turn rests on a weighing device generally designated by the reference numeral W which, by means of a pointer 15 sweeping the indicator dial 16, indicates the quantity of material disposed on the conveyor belt 13. The scale of the dial 16 may equally well be calibrated to indicate the weight transported per unit of time. The quantities of the individual constituents passing through the discharge orifices 4 of the individual supply containers 1 and 2, and onto the conveyor belts 13 located thereunder, are transported to a main collecting conveyor belt 17. The collecting conveyor belt 17 conveys the individual constituents, now heaped in layer or batch formation, to any suitable mixing bin or a mixing drum from which a mixture always having the same proportions of constituents can be continuously drawn.

The conveyors 13 provided for the weighing device W are mounted for pivotable movement about a fulcrum or support 50 and driven by the motor 21. The inclining or pivotable movement of the weighing device is transmitted by remote repeater or transmission means R to a control indicating unit C located at the remotely positioned central station generally designed by reference numeral 18. Corresponding to the position of the pointers 15 on the indicator dials 16 there are arranged at a remote central control station 18 indicating units provided with pointers 19 and indicator dials 20, each of the latter reproducing or repeating the position of the corresponding pointer 15 on its associated indicator dial 16. The respective pointers 15 and 19 are moved in complete synchronism with one another by means of a potentiometer arrangement, that is to say, a magnetic or electric rotating field system, conveniently termed a so-called electric shaft corresponding to a generator and synchronous motor arrangement. Thus, a particular angular displacement of the transmitter unit 31 of the repeater mechanism R results in an exactly similar and corresponding angular displacement of the receiver 33 of said repeater mechanism R. Accordingly, the control station 18 is provided with a separate control indicating unit C for each of the weighing devices W associated with each supply container to record and indicate the quantity by weight or quantity by weight per unit of time emerging from the respective supply container in dependence upon the manner in which the dial 16 has been initially calibrated.

Figure 3:
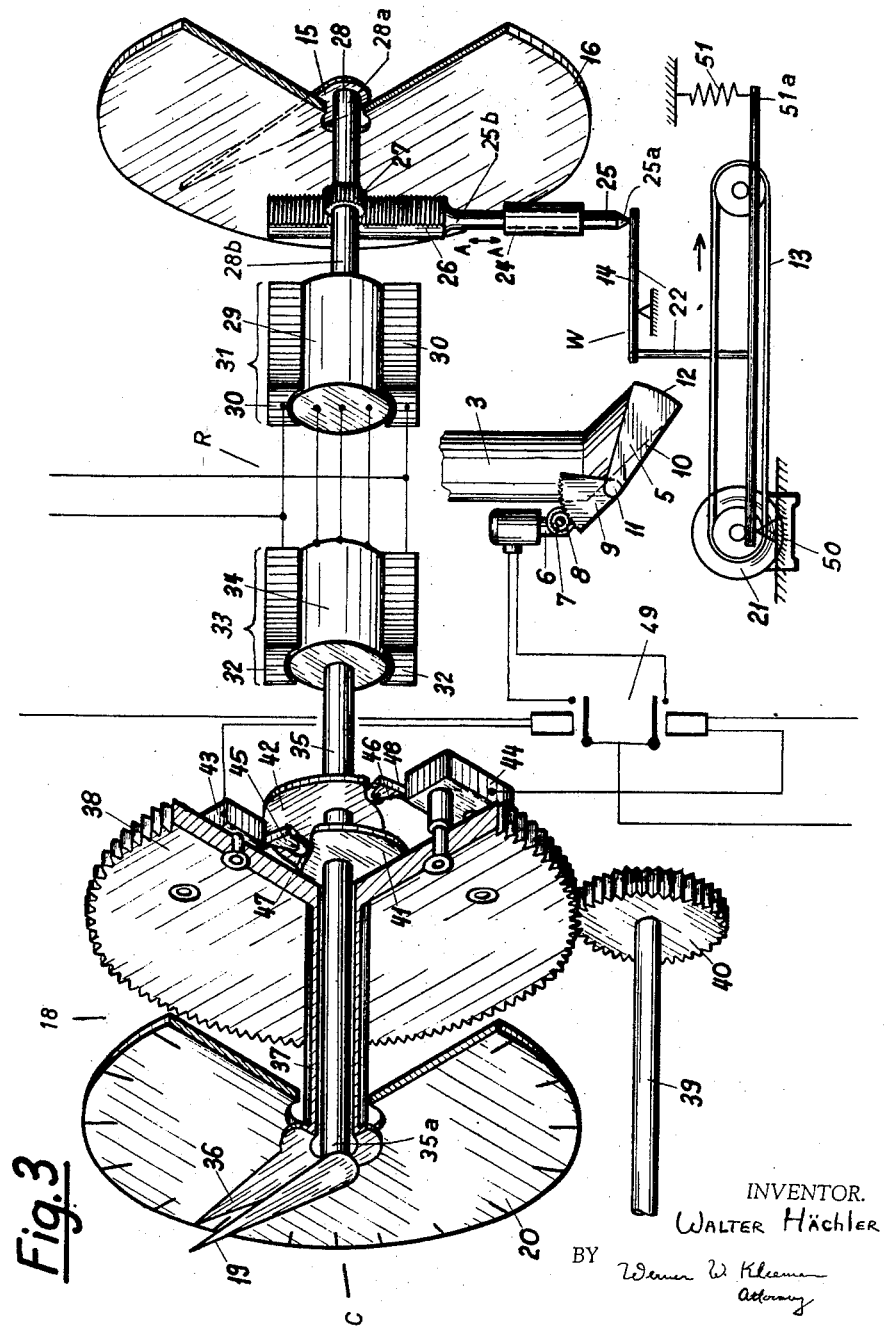
FIGURE 3 is a diagrammatic view, partly in perspective, of the control unit controlling the weighing device and schematically showing the details of the electric control circuit for actuating the driving motor of the supply container to regulate the dispensing operation.

In FIGURE 3 there is diagrammatically illustrated the details of a weighing device W provided with a conveyor belt 13 serving as a balance member and driven by a motor 21, said conveyor belt being supported for inclined and pivotable movements about the supporting fulcrum 50. The outer end 51a of the weighing device W is suspended by means of a tension spring 51. The inclining movements of the weighing device W, as a particular quantity of constituent is deposited onto the surface of the conveyor 13, are transmitted through the linkage assembly 22 including a double-armed pivotally mounted lever 14. The lever 14 is arranged in abutting relation to the bottom end 25a of a shaft 25 supported in a bushing 24, said shaft being provided at its upper end 25b with a rack portion 26 engageable with a pinion 27 fixedly mounted on a rotatable shaft 28. The inclined movement of the conveyor belt 13 is transmitted through the linkage 22 including the pivot shaft 14 to the slidable shaft 25, thereby causing a displacement of said shaft 25 in the direction of the double-headed arrow A—A. The shaft 28 carrying the pinion 29 supports at one end 28a the pointer 15 adapted to sweep the indicator dial 16. At the other end 28b of shaft 28 there is arranged a transmitter unit 31 provided with an armature 29 of a rotating field system or similar device, the field poles 30 of which are electrically connected to the field poles 32 of a receiver 33, in such a manner that the movement of the armature 29 is synchronously transmitted to the remotely disposed armature 34 located at the control station 18. Thus, the transmitter 31 which, in fact, simulates a generator arrangement causes an exactly similar movement by electrical means of the remote receiver 33 which, in fact, simulates a motor unit. The armature 34 of the receiver 33 is rigidly mounted on a control shaft 35 which carries at one end 35a an indicator or control pointer 19 sweeping the control indicator dial 20. The indicator dial 20 is provided with a rotatably mounted setting pointer 36 rigidly secured to a sleeve 37 disposed circumjacent the control shaft 35 and coaxially arranged therewith. The pre-setting of the setting pointer 36 may be effectuated manually by means of a hand wheel, not shown but similar to the hand wheel 84 of FIGURE 5, a shaft 39 and a pinion 40 engaging a gear wheel 38 seated on the sleeve 37. Arranged on the control shaft 35 are two cams 41 and 42 which are capable of being locked in a predetermined position and which, for purposes of setting of the desired dispensing quantity, can be rotated relative to one another and during the operation of the weighing device partake the rotation of the control shaft 35.

A pair of electric switches 43 and 44, preferably microswitches, are mounted on the gear wheel 38 in such a manner that they are able to cooperate with the two cams 41 and 42. The cam follower 45 supported by the microswitch 43 is adapted to rest against the outer surface of the cam 41, whereas a cam follower 46 supported by the microswitch 44 is adapted to rest against the outer surface of the cam 42. When the control pointer 19 or the setting pointer 36 is moved, the respective cam followers 45 and 46 slidably move along the cam surfaces of their respective cams until they drop into the recesses 47 of the cam 41 or the recess 48 of the cam 42 respectively. Accordingly, when the cam followers bear against an elevated or projected portion of their associated cam the circuit of the associated microswitch is closed, with the attendant result that the motor 6 for operating the regulating slide 5 is started into operation by means of a relay unit 49 in one or the other direction. When the pointers 19 and 36 are in synchronism, that is to say, in superimposed relationship with one exactly on top of or behind the other, neither of the microswitches 43 and 44 is actuated so that the motor 6 is stopped and the then located position of the regulating slide 5 is retained. If the weight of the fluent material on its associated conveyor belt exceeds the setting value of the setting indicator 36, the motor 6 is caused to rotate in a direction which carries out a corresponding closing movement of the regulating slide 5 so that less material will pass through the discharge orifice 4 onto the conveyor belt 13. Similarly, if the weight of the material on the conveyor belt 13 is too low, the motor 6 starts running in an opposite direction to increase the effective discharge opening 4, thereby increasing the rate of discharge of the material. If no importance is attached to the adjustability of the mid-position, that is to say, the position when the pointers are in superimposed relation, the two cams 41 and 42 may be replaced by means of a single cam. In such a case, both of the microswitches 43 and 44 will interact with a common cam. The starting and stopping of the motor in the relevant direction results in a gradual approach to the desired quantity by weight to be transported per unit of time by the conveyor belt 13. Thus, by adjusting the relative position of the cams 41 and 42, it is possible to set the responding accuracy, or tolerance limit of the quantity of the material to be dispensed, a departure from which causes the motor 6 to be set running in one or the other direction.

In operation of the system, the hand wheel is employed to move the setting pointer 36 to the desired index point, representing a desired discharge of material from its associated supply container 1 or 2 on the control dial 20. If the control pointer 19 is positioned in superimposed relation with respect to the setting pointer 36 then the regulating slide member is in its required position to permit delivery of the desired quantity of material through the discharge orifice 4. Should, however, the weighing unit W indicate a delivered quantity of material different than the desired pre-set value of the setting pointer 36, the repeater mechanism R causes the control pointer 19 to either lead or trail the setting pointer 36 as the case may be. The cam members 41 and 42 will then cause actuation of one of the microswitches 43 or 44 to actuate the relay 49. Thus, the driving motor 6 is energized for rotation in a required direction in order to move the regulating slide 5 a corresponding amount such that finally the setting pointer 36 and control pointer 19 will again be in superimposed relation thereby indicating that the supply container is delivering the correct quantity of material as originally determined by the setting of the setting pointer on the control dial 20.

Figure 4:
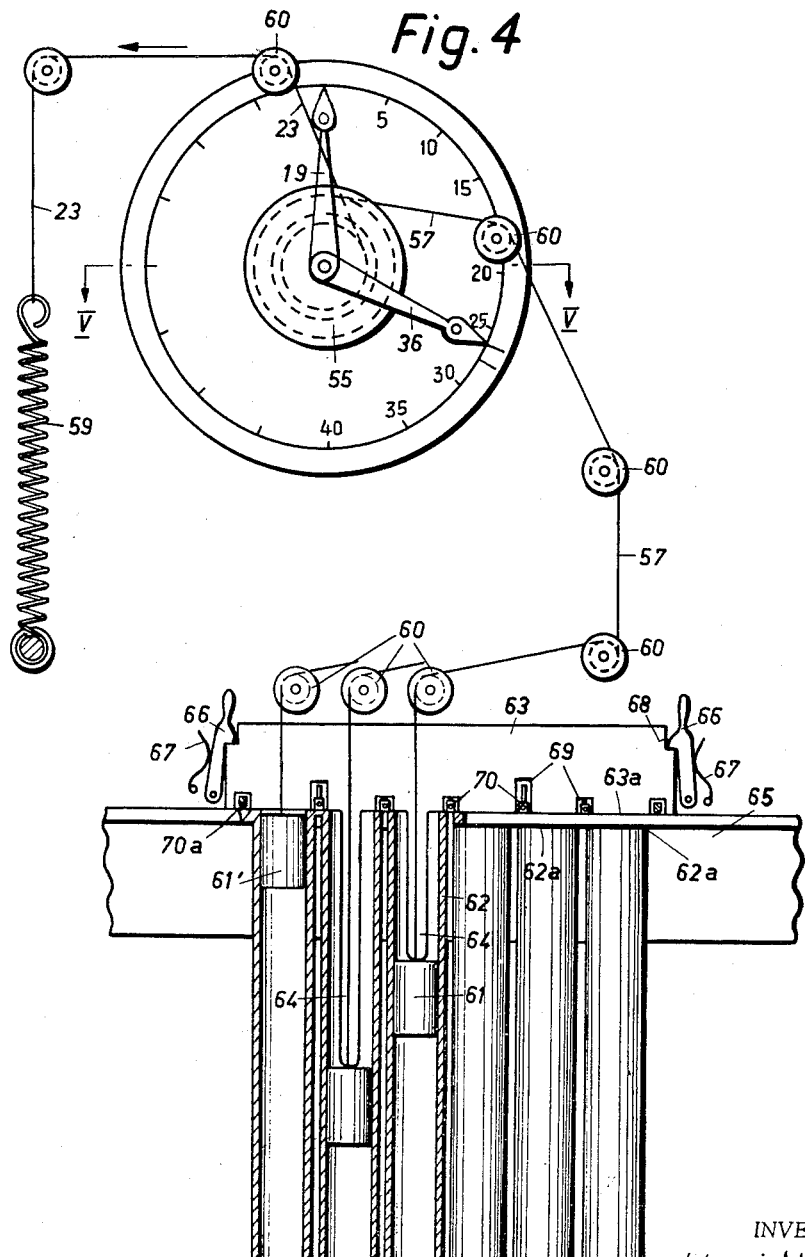
FIGURE 4 illustrates diagrammatically, a dispensing device set to a specific mixing ratio by means of a templet.
Figure 5:
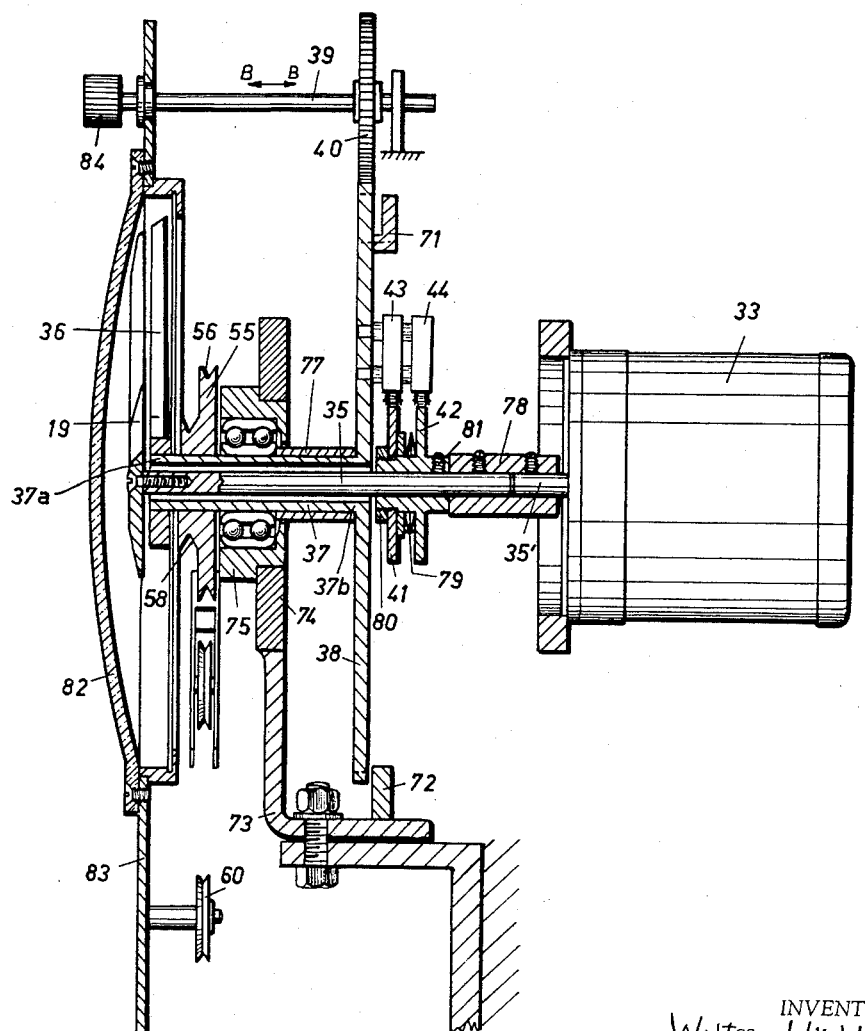
FIGURE 5 is a cross-section view of the device shown in FIGURE 4 taken along the line V—V thereof.

In FIGURES 4 and 5 there is shown a further embodiment of the present invention, wherein a predetermined mode of mixing and the attainment of a predetermined ratio of individual constituents can be set by means of templet-type elements. The principle of operation of such a weighing system is that the rotary movement of a setting pointer 36 is converted into a straight line or linear movement and the distance thereof fixed by means of a templet. To this end, there is provided a pulley 55 which is rigidly connected to a setting pointer 36 so as to turn stepwise and in synchronism therewith. A pulley rope or wire cord 57 is wound around and fastened in a groove 56 provided on said pulley 55. A second pulley rope or wire cord 23 is guided in a groove 58 of smaller diameter than the groove 56 and also fastened to the pulley 55. The pulley rope 23 is connected by means of a guide roller 60a to a tension spring 59 which exerts tension on the pulley rope 23. The arrangement is such that the tension spring 59 is in a slightly tensioned or stressed condition when the setter pointer 36 is in its zero position. The pulley rope 57 is passed around several guide rollers 60 and is secured to a piston member or pulley weight 61 readily slidable in a guide tube or cylinder 62. A similar arrangement and device of the aforementioned type is provided for the supply containers for each constituent to be dispensed and from which the mixture is to be formed. In FIGURE 4 there is shown an arrangement for the weighing out of six separate constituents. However, for the sake of clarity, the details of only one of these six identical units has been shown.

The object of this templet-type control system is to streamline and increase the speed of setting of certain mixing ratios of ingredients or constituents which are periodically and oftentimes employed. A templet 63 provided with fingerlike extensions or detents 64, which may be releasably secured to said template, is secured to a carrier plate 65 by means of the clamping levers 66. The clamping levers 66 are spring loaded by means of the spring 67, each of which engages a shoulder or slot 68 provided at the respective edges of the template 63 to thus lock the template in position. The fingerlike extensions 64 of the template 63, which is preferably made of sheet-metal, push and maintain the pulley weights 61 a certain distance down into the interior of the respective tubes 62, these distances correspond to the respective length of the fingerlike extensions 64. As a result of the downward movement of the respective pulley weights 61 the attached pulley cords 57 are displaced a corresponding distance down the length of the tube so as to rotate the setting pointers 36 through a corresponding angle to thus set each of said pointers 36 at a predetermined dispensing value. Should one of the constituents not be needed for the particular mixing operation, the particular finger-like extension 64 provided therefor may be discarded, as can be clearly seen at the left-hand portion of the template 63 opposite the pulley weight 61' of FIGURE 4. The greater the extension of the fingerlike extension 64 the further will be the angular deflection of the setting pointer 36. The template 63 is provided at its bottom end 63a with a plurality of substantially equally spaced recesses or slots 69 disposed opposite the upper rim portions 62a of the tubes 62. The slots 69 are suitably dimensioned so that each can accommodate a microswitch 70. Thus, with the template 63 placed in its operative position, the individual microswitches 70 will either be in an opened or closed condition depending, of course, upon the depth of the provided slot 69. It is to be appreciated that each of the pulley weights 61 and each of the driving control devices for the regulating side 5 provided for each supply container for the separate constituents is associated with a separate microswitch 70 which, for example, when actuated so as to be in a closed condition, permits the relevant part of the weighing system to be set into operation, as for example, by switching the electric motor contacts either on and off. Moreover, it is possible to arrange at the sides of the template 63 further micro switches 70a designed, for example, to keep the system locked until the template 63 is properly positioned or to perform some other desired function.

Thus, by simply changing the template 63 and the design thereof in terms of the length of the fingerlike extensions 64, it is possible to set the system to deliver and mix any desired predetermined proportional ratio of the specific constituents obtained in their associated supply containers. When the template 63 is removed by simply disengaging the clamping levers 66, the tension spring 59 acting through the respective pulley cords 23 and 57 pulls the respective pulley weights 61 back into their initial position, similar to the position of the pulley weight 61' as shown in FIGURE 4. Consequently, the setting pointer 36 is also caused to return to its zero position, and a stop member 71 (FIGURE 5) is brought up against a fixed dog 72 secured to a tab or bracket 73. The bracket 73 is rigidly connected to a disk member 74 carrying a ball bearing 75. Located adjacent the ball bearing 75 is the pulley 55 provided with the two pulley grooves 56 and 58 and which in turn is rigidly connected to the sleeve member 37 so as to turn together therewith. Also rigidly connected to one end 37a of the sleeve 37 is the setting pointer 36, whereas at the other end 37b of said sleeve there is mounted the gear wheel 38. The shaft 39 carrying the pinion 40 is adapted to be axially displaced in the direction of the double-headed arrow B—B by means of the hand-operated control wheel 84 to thereby disengage the two gear wheels 38 and 40 under those circumstances where the setting of the setting pointer 36 is not to be carried out manually, but rather, by means of the template-type control system hereinabove previously described.

A spacing collar 77 is slipped onto the sleeve 37 in order to maintain the ball bearing 75 at a specified distance from the gear wheel 38. A coupling sleeve 78 carried by the stub shaft 35' of the rotating field system receiver or sychronism motor 33 serves to couple and connect the receiver 33 with the control shaft 35. The cams 41 and 42 are mounted on the control shaft 35 and between which a pair of springs 79 are arranged. Thus, by slackening a threaded collar 80 and possibly the screw 81 it is possible to rotate the cams 41 and 42 relative to one another and relative to the control shaft 35 in order to adjust the sensitivity of control of the mid-position, that is to say, when the pointers 36 and 19 are in superimposed relation on top of one another. A similar adjusting arrangement is also produced for the cam members 41 and 42 shown in FIGURE 3. The pointers 19 and 36 may be protected by means of a transparent viewing glass 82 carried by the housing wall 83 of the control unit C. The operation of the device shown in FIGURES 4 and 5 corresponds to that described with respect to FIGURE 3. Although FIGURE 4 shows the device designed for handling a total of six different constituents to be mixed, the system can, of course, be constructed to handle any other number of constituents.

Moreover, instead of employing cylindrical pistons or pulley weights 61 cooperating with the guide tube 62 it is also possible to employ flat plate members guided in guideways provided on a pair of plates spaced at a predetermined distance from one another. It is also further possible to provide for a cut-off switch which may be actuated by an indicating instrument and which cuts off the system when a certain maximum load is reached.

Having thus described the present invention what is desired to be secured by United States Letters Patent is:

1. A device for the automatic weighing of individual constituents; comprising supply means for dispensing a quantity of a material to be weighed, weighing means associated with said supply means for receiving and weighing material dispensed from said supply means, said weighing means including conveyor means mounted for pivotal movement, means for driving said conveyor means at a constant speed, regulating means cooperable with said supply means for controlling the quantity of material dispensed therefrom, control means remotely positioned from said supply means for setting of the desired quantity of said material to be dispensed and operatively connected with said regulating means for actuating the latter to control the dispensing of material from said supply means, and repeater means communicating with said control means and said weighing means in order to transmit a reading of the quantity of material received by said weighing means to said remotely positioned control means.

2. A device for the automatic weighing and dispensing of individual constituents adapted to be mixed in a predetermined proportional ratio; comprising separate supply means each capable of dispensing a quantity of a material to be weighed, weighing means associated with each of said supply means for receiving and weighing material dispensed from its associated supply means, each of said weighing means including conveyor means mounted for pivotal movement, means for driving each of said conveyor means at a constant speed, individual regulating means provided for each of said supply means controlling the quantity of material dispensed therefrom, respective control means remotely positioned from said separate supply means for setting of the desired quantity of said material to be dispensed from each of said supply means and respectively in registry with said individual regulating means for actuating the latter to control the dispensing of material from each of said supply means, and separate repeater means communicating with said respective control means and its associated weighing means in order to transmit a reading of the quantity of material received by said associated weighing means to said remotely positioned respective control means.

3. A device for the automatic weighing and control of individual constituents adapted to be mixed in a predetermined proportional ratio; comprising separate supply means each capable of dispensing a quantity of a material to be weighed, weighing means including conveyor means mounted for pivotal movement and associated with each of said supply means for receiving and weighing material dispensed from its associated supply means, drive means cooperable with said conveyor means to drive the latter at a constant speed, individual regulating means provided for each of said supply means for controlling the quantity of material dispensed therefrom, respective control means remotely positioned from said separate supply means for setting of the desired quantity of said material to be dispensed from each of said supply means and respectively in registry with said individual regulating means for actuating the latter to control the dispensing of material from each of said supply means, and separate repeater means communicating with said respective control means and its associated weighing means in order to transmit a reading of the quantity of material received by said associated weighing means to said remotely positioned respective control means.

4. A device for the automatic weighing and control of individual constituents adapted to be mixed in a predetermined proportional ratio; comprising separate supply means each having a discharge opening capable of dispensing a quantity of a material to be weighed, weighing means associated with each of said supply means for receiving and weighing material dispensed from its associated supply means, each of said weighing means including conveyor means mounted for pivotal movement, means for driving each of said conveyor means at a constant speed, individual regulating means provided for each of said supply means for controlling the quantity of material dispensed therefrom, said individual regulating means including a displaceable slide member controlling the discharge opening of said separate supply means, drive means in registry with said slide member to displace the latter, respective control means remotely positioned from said separate supply means for setting of the desired quantity of said material to be dispensed from each of said supply means and respectively in registry with said individual regulating means for actuating the latter to control the dispensing of material from each of said supply means, and separate repeater means communicating with said respective control means and its associated weighing means in order to transmit a reading of the quantity of material received by said associated weighing means to said remotely positioned respective control means.

5. A device for the automatic weighing and control of individual constituents adapted to be mixed in a predetermined proportional ratio; comprising separate supply means each capable of dispensing a quantity of a material to be weighed, weighing means associated with each of said supply means for receiving and weighing material dispensed from its associated supply means, each of said weighing means including conveyor means mounted for pivotal movement, means for driving each of said conveyor means at a constant speed, individual regulating means provided for each of said supply means for controlling the quantity of material dispensed therefrom, respective control means remotely positioned from said separate supply means for setting of the desired quantity of said material to be dispensed from each of said supply means and respectively in registry with said individual regulating means for actuating the latter to control the dispensing of material from each of said supply means, said respective control means including a relay in circuit with said regulating means to actuate the latter, switch means for energizing said relay and cam means cooperable with and actuating said switch means, and separate repeater means communicating with said respective control means and its associated weighing means in order to transmit a reading of the quantity of material received by said associated weighing means to said remotely positioned respective control means.

6. A device for the automatic weighing and control of individual constituents adapted to be mixed in a predetermined proportional ratio; comprising separate supply means each having a discharge opening capable of dispensing a quantity of a material to be weighed, weighing means including conveyor means mounted for pivotal movement and associated with each of said supply means for receiving and weighing material dispensed from its associated supply means, individual regulating means provided for each of said supply means for controlling the quantity of material dispensed therefrom, said individual regulating means including a displaceable slide member controlling the discharge opening of said separate supply means, drive means in registry with said slide member to displace the latter, respective control means remotely positioned from said separate supply means for setting of the desired quantity of said material to be dispensed from each of said supply means and respectively in registry with said individual regulating means for actuating the latter to control the dispensing of material from each of said supply means, and separate repeater means communicating with said respective control means and its associated weighing means in order to transmit a reading to said remotely positioned respective control means of the quantity of material received by said conveyor means of said associated weighing means influencing the extent of pivotal movement of said conveyor means.

7. A device for the automatic weighing and control of individual constituents adapted to be mixed in a predetermined proportional ratio; comprising separate supply means each having a discharge opening capable of dispensing a quantity of a material to be weighed, weighing means including conveyor means mounted for pivotal movement and associated with each of said supply means for receiving and weighing material dispensed from its associated supply means, individual regulating means provided for each of said supply means for controlling the quantity of material dispensed therefrom, said individual regulating means including a displaceable slide member controlling the discharge opening of said separate supply means, drive means in registry with said slide member to displace the latter, respective control means remotely positioned from said separate supply means for setting of the desired quantity of said material to be dispensed from each of said supply means, said control means including relay means in registry with said individual regulating means for actuating said drive means to displace said slide member in order to control the dispensing of material from each of said supply means, and separate repeater means communicating with said respective control means and its associated weighing means in order to transmit a reading to said remotely positioned respective control means of the quantity of material received by said conveyor means of said associated weighing means and influencing the extent of pivotal movement of said conveyor means.

8. A device for the automatic weighing and control of individual constituents adapted to be mixed in a predetermined proportional ratio; comprising separate supply means each having a discharge opening capable of dispensing a quantity of a material to be weighed, weighing means including conveyor means mounted for pivotal movement and associated with each of said supply means for receiving and weighing material dispensed from its associated supply means, said weighing means further including pinion and rack means for transforming pivotal movement of said conveyor means into an angular movement of a control means, individual regulating means provided for each of said supply means for controlling the quantity of material dispensed therefrom, said individual regulating means including a displaceable slide member controlling the discharge opening of said separate supply means, drive means in registry with said slide member to displace the latter, respective control means remotely positioned from said separate supply means for setting of the desired quantity of said material to be dispensed from each of said supply means and respectively in registry with said individual regulating means for actuating the latter due to said angular movement thereof to control the dispensing of material from each of said supply means, and separate repeater means including a receiver unit communicating with said respective control means and a transmitter unit communicating with its associated weighing means in order to transmit a reading to said remotely positioned respective control means of the quantity of material received by said conveyor means of said associated weighing means and influencing the extent of pivotal movement of said conveyor means.

9. A device for the automatic weighing and control of individual constituents adapted to be mixed in a predetermined proportional ratio; comprising separate supply means each having a discharge opening capable of dispensing a quantity of a material to be weighed, weighing means including conveyor means mounted for pivotal movement and associated with each of said supply means for receiving and weighing material dispensed from its associated supply means, individual regulating means provided for each of said supply means for controlling the quantity of material dispensed therefrom, said individual regulating means including a displaceable slide member controlling the discharge opening of said separate supply means, drive means in registry with said slide member to displace the latter, respective control means including a control pointer remotely positioned at a common control station from said separate supply means for setting of the desired quantity of said material to be dispensed from each of said supply means, said control means being in registry with said individual regulating means for actuating said displaceable slide member to control the dispensing of material from each of said supply means, said control means further including rotatable cam means, relay means in circuit with said drive means, switch means cooperable with said cam means to energize said relay means so as to actuate said drive means, said control pointer being operatively connected with said cam means to rotate the latter, and separate repeater means communicating with said respective control means and its associated weighing means in order to transmit a reading to said remotely positioned respective control means of the quantity of material received by said conveyor means of said associated weighing means influencing the extent of pivotal movement of said conveyor means.

10. A device according to claim 9, said control means further including indicator pointer means coaxially arranged with respect to said control pointer for rotation about a common axis, said control means deenergizing said relay means when said control pointer and said indicator pointer means are in super-imposed relation.

11. A device for the automatic weighing and control of individual constituents adapted to be mixed in a predetermined proportional ratio; comprising separate supply means each having a discharge opening capable of dispensing a quantity of a material to be weighed, weighing means including conveyor means mounted for pivotal movement and associated with each of said supply means for receiving and weighing material dispensed from its associated supply means, individual regulating means provided for each of said supply means for controlling the quantity of material dispensed therefrom, said individual regulating means including a displaceable slide member controlling the discharge opening of said separate supply means, drive means in registry with said slide member to displace the latter, respective control means including a control pointer remotely positioned at a common control station from said separate supply means for setting of the desired quantity of said material to be dispensed from each of said supply means, said respective control means further including pulley means in registry with said control pointer, and means for actuating said pulley means to linearly displace the latter a predetermined extent to thus cause a corresponding angular displacement of said control pointer to quickly assume a position corresponding to a quantity of material to be dispensed, said control means being in registry with said individual regulating means for actuating said displaceable slide member to control the dispensing of material from each of said supply means, said control means further including rotatable cam means, relay means in circuit with said drive means, switch means cooperable with said cam means to actuate said drive means, said control pointer being operatively connected with said cam means to rotate the latter, and separate repeater means communicating with said respective control means and its associated weighing means in order to transmit a reading to said remotely positioned respective control means of the quantity of material received by said conveyor means of said associated weighing means influencing the extent of pivotal movement of said conveyor means.

12. A device according to claim 11, said means for actuating said pulley means being a template member provided with projecting portions actuating the respective control means to angularly displace the control pointer thereof a desired extent corresponding to a quantity of material to be dispensed.

13. A device according to claim 12, wherein said projecting portions of said template member are of differing length each corresponding to a quantity of material to be dispensed.

14. A device according to claim 13, wherein said pulley means includes a pulley cord, a pulley weight carried at one end of said pulley cord, a guide tube receiving said pulley weight, said projecting portions coacting with said pulley weight to displace the same down the length of said guide tube a linear distance substantially corresponding to the length of said projecting portion.

15. A device for the automatic weighing of at least one individual constituent; comprising supply means for dispensing a quantity of material to be weighed, weighing means including conveyor means mounted for pivotal movement associated with said supply means for receiving and weighing material dispensed from said supply means, means for driving said conveyor means at a constant speed, regulating means cooperating with said supply means for controlling the quantity of material dispensed therefrom, control means remotely positioned from said supply means for setting of the desired quantity of said material to be dispensed and operatively connected with said regulating means for actuating the latter to control the dispensing of material from said supply means, and repeater means communicating with said control means and said weighing means to actuate said regulating means to cause said desired quantity of material to be dispensed from said supply means, said repeater means including a transmitter unit and a receiver unit with said transmitter unit being actuated by pivotal movement of said conveyor means.

References Cited in the file of this patent

UNITED STATES PATENTS

| 2,544,155 | Harkenrider | Mar. 6, 1951 |
| 2,609,965 | Kast | Sept. 9, 1952 |
| 2,637,434 | Harper | May 5, 1953 |
| 2,917,207 | Prowse et al. | Dec. 15, 1959 |